(12) United States Patent
Mazuk et al.

(10) Patent No.: US 8,306,421 B1
(45) Date of Patent: *Nov. 6, 2012

(54) PASSIVE OPTICAL AVIONICS NETWORK INCLUDING OPTICAL REPEATER

(75) Inventors: Daniel E. Mazuk, Marion, IA (US); David A. Miller, Swisher, IA (US); Mark A. Kovalan, Cedar Rapids, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 1043 days.

This patent is subject to a terminal disclaimer.

(21) Appl. No.: 12/220,014

(22) Filed: Jul. 21, 2008

Related U.S. Application Data

(63) Continuation-in-part of application No. 12/151,249, filed on May 5, 2008.

(51) Int. Cl.
 *H04B 10/20* (2006.01)
(52) U.S. Cl. .......................................... 398/66; 398/168
(58) Field of Classification Search ................... 398/72, 398/168
See application file for complete search history.

(56) References Cited

U.S. PATENT DOCUMENTS

| | | | |
|---|---|---|---|
| 7,657,330 B2* | 2/2010 | Morrison | 700/19 |
| 2005/0191053 A1* | 9/2005 | Levinson et al. | 398/25 |
| 2008/0193130 A1* | 8/2008 | Chae et al. | 398/67 |
| 2009/0202241 A1* | 8/2009 | Yu et al. | 398/58 |
| 2009/0208210 A1* | 8/2009 | Trojer et al. | 398/58 |

* cited by examiner

*Primary Examiner* — Leslie Pascal
(74) *Attorney, Agent, or Firm* — Donna P. Suchy; Daniel M. Barbieri

(57) ABSTRACT

The present disclosure is directed to a passive optical avionics network system and method.

A avionics network system may comprise: (a) a passive optical network, the passive optical network comprising an optical repeater; and (b) an avionics module operably coupled to the passive optical network.

An integrated modular avionics (IMA) system may comprise: (a) a line-replaceable unit (LRU), the LRU comprising: (i) a processing unit; and (ii) an optical line terminal (OLT); (b) an optical repeater; (c) at least one optical network unit (ONU); and an avionics module operably coupled to the at least one ONU.

A method for avionics network communication may comprise: (a) receiving optical avionics data signals; (b) monitoring the optical avionics data signals for compliance with a communications protocol; and (c) regulating transmission of the optical avionics data signals according to compliance with the communications protocol.

11 Claims, 4 Drawing Sheets

PASSIVE OPTICAL AVIONICS NETWORK INCLUDING OPTICAL REPEATER

CROSS-REFERENCE TO RELATED APPLICATIONS

The present application is related to and claims the benefit of the earliest available effective filing date(s) from the following listed application(s) (the "Related Applications") (e.g., claims earliest available priority dates for other than provisional patent applications or claims benefits under 35 USC §119(e) for provisional patent applications, for any and all parent, grandparent, great-grandparent, etc. applications of the Related Application(s)).

RELATED APPLICATIONS

For purposes of the USPTO extra-statutory requirements, the present application constitutes a continuation-in-part of U.S. patent application Ser. No. 12/151,249, entitled Passive Optical Avionics Network, naming Daniel E. Mazuk, Peter J. Morgan, David A. Miller, Nicholas H. Bloom, Mark A. Kovalan as inventors, filed May 5, 2008, which is currently co-pending, or is an application of which a currently co-pending application is entitled to the benefit of the filing date.

The United States Patent Office (USPTO) has published a notice to the effect that the USPTO's computer programs require that patent applicants reference both a serial number and indicate whether an application is a continuation or continuation-in-part. Stephen G. Kunin, Benefit of Prior-Filed Application, USPTO Official Gazette Mar. 18, 2003, available at http://www.uspto.gov/web/offices/com/sol/og/2003/week11/patbene.htm. The present Applicant Entity (hereinafter "Applicant") has provided above a specific reference to the application(s) from which priority is being claimed as recited by statute. Applicant understands that the statute is unambiguous in its specific reference language and does not require either a serial number or any characterization, such as "continuation" or "continuation-in-part," for claiming priority to U.S. patent applications. Notwithstanding the foregoing, Applicant understands that the USPTO's computer programs have certain data entry requirements, and hence Applicant is designating the present application as a continuation-in-part of its parent applications as set forth above, but expressly points out that such designations are not to be construed in any way as any type of commentary and/or admission as to whether or not the present application contains any new matter in addition to the matter of its parent application(s).

All subject matter of the Related Applications and of any and all parent, grandparent, great-grandparent, etc. applications of the Related Applications is incorporated herein by reference to the extent such subject matter is not inconsistent herewith.

BACKGROUND

Modern onboard avionics networks for serve to provide data transfer between all facets of an aircraft. Avionics systems typically have a variety of systems that provide data to processing components of the aircraft or exchange data among one or more other components of the aircraft. For example, a variety of avionics modules may gather avionics data (e.g., sensors detecting speed, direction, external temperature, control surface positions, and the like) that is routed by the avionics system via an avionics network to one or more aircraft components such as displays, monitoring circuits, processors, and the like. A passive optical network (PON) tree-topology based solution for avionics communication system, such as that disclosed in copending U.S. patent application Ser. No. 12/151,249 may provide the network interconnects between such components.

Large air transport aircraft have on the order of 250 access network devices which are connected to the avionics topology. The cost and complexity of certain components implementing fail-passive operational design in a PON avionics topology may be prohibitive. As such there may be a motivation to include some commercial of the shelf (COTS) PON components in connected access network devices. However, such COTS PON components may lack fail-passive operation design such and possess higher failure rates than more expensive fail-passive components.

As such, it may be desirable to logically and electrically isolate branches of a PON tree from the remaining PON total tree so as to restrict any fault-effect within an isolated branch that branch, avoiding impact on the rest of the PON tree.

SUMMARY

The present disclosure is directed to a passive optical avionics network system and method.

A avionics network system may comprise: (a) a passive optical network, the passive optical network comprising an optical repeater; and (b) an avionics module operably coupled to the passive optical network.

An integrated modular avionics (IMA) system may comprise: (a) a line-replaceable unit (LRU), the LRU comprising: (i) a processing unit; and (ii) an optical line terminal (OLT); (b) an optical repeater; (c) at least one optical network unit (ONU); and an avionics module operably coupled to the at least one ONU.

A method for avionics network communication may comprise: (a) receiving optical avionics data signals; (b) monitoring the optical avionics data signals for compliance with a communications protocol; and (c) regulating transmission of the optical avionics data signals according to compliance with the communications protocol It is to be understood that both the foregoing general description and the following detailed description are exemplary and explanatory only and are not necessarily restrictive of the claims. The accompanying drawings, which are incorporated in and constitute a part of the specification, illustrate examples and together with the general description, serve to explain the principles of the disclosure.

BRIEF DESCRIPTION OF THE DRAWINGS

The numerous advantages of the disclosure may be better understood by those skilled in the art by reference to the accompanying figures in which.

DETAILED DESCRIPTION

Figure 1:
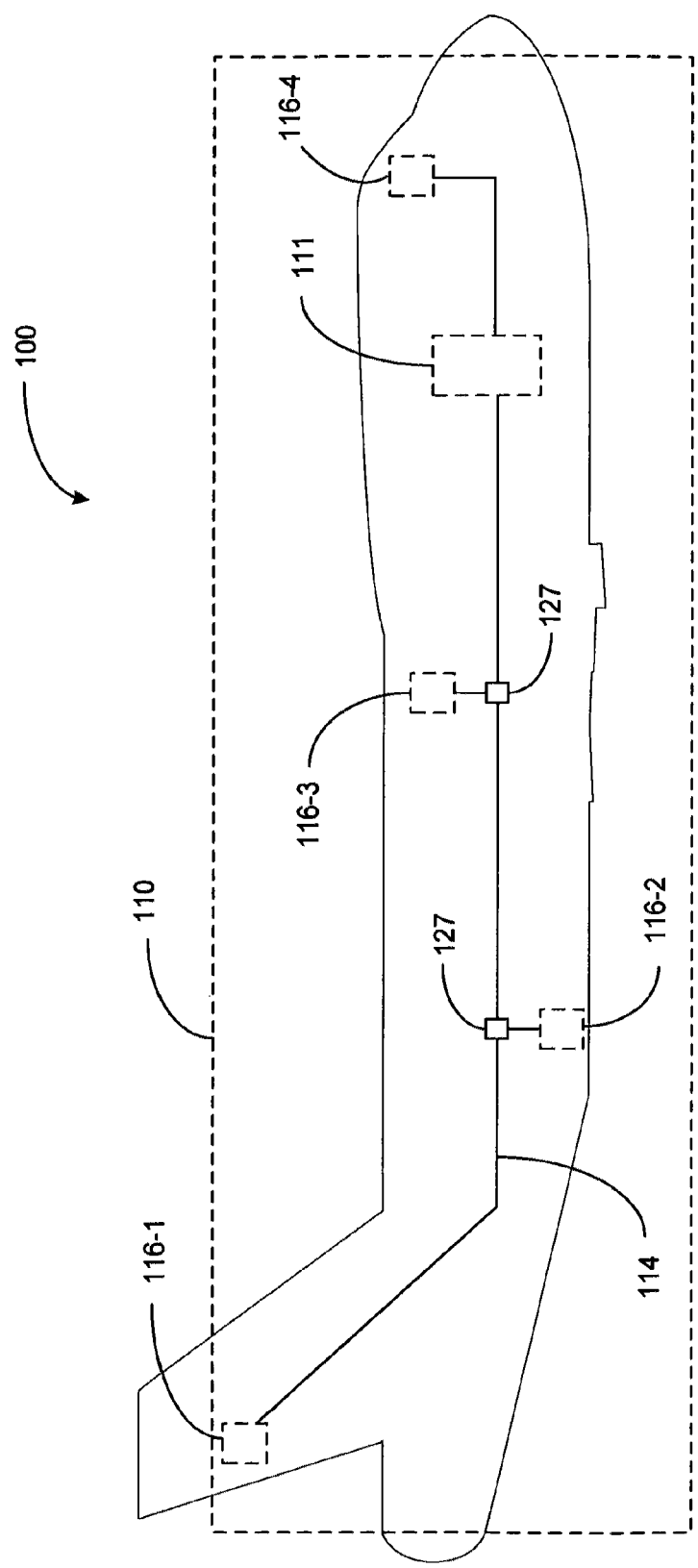
FIG. 1 illustrates an aircraft employing a passive optical avionics network.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here.

FIG. 1 illustrates an example system in which one or more technologies may be implemented. An aircraft 100 may include a PON-based avionics system 110 comprising a head-end processing unit 111 including at least one processor 112 (not shown) operably coupled to at least one optical line terminal (OLT) 113 (not shown); a fiber optic bus 114; at least one optical network unit (ONU) 115 (not shown) operably coupled to an avionics module 116.

An avionics module 116 may include flight control surface sensors 116-1, landing gear sensors 116-2, cabin climate control sensors 116-3, cockpit display devices 116-4, etc. It should be noted that while the various avionics modules 116 are depicted as discrete distributed components, it will be recognized by one skilled in the art that such functionality (e.g. control functionality, sensor functionality, etc.) may be implemented in any number of forms including but not limited to software, hardware, firmware, application specific integrated circuitry (ASICs) and the like and may be configured as part of distributed or integrated systems without departing from the scope of the present disclosures.

The PON-based avionics system 110 may be an optical network forming a tree-structured distributed topology by connecting multiple ONU 115 to a single OLT 113 using a 1×N optical distribution network.

Various standards for PON versions (e.g. Ethernet PON (EPON) and Gigabit Ethernet PON (GEPON)) have been described by technical organizations for use in fiber-to-the-home communications networks. Particularly the Institute of Electrical and Electronics Engineers has published IEEE 802.3ah detailing standards for EPON and GEPON. The International Telecommunications Union-Telecommunication Standardization Sector (ITU-T) has published ITU-T G.984.1-G.984.4 detailing standards for gigabit passive optical networks (GPON). One of skill in the art will recognize that the PON-based avionics system 110 of the present invention may be implemented by any PON, including EPON/GEPON and GPON.

Figure 2:
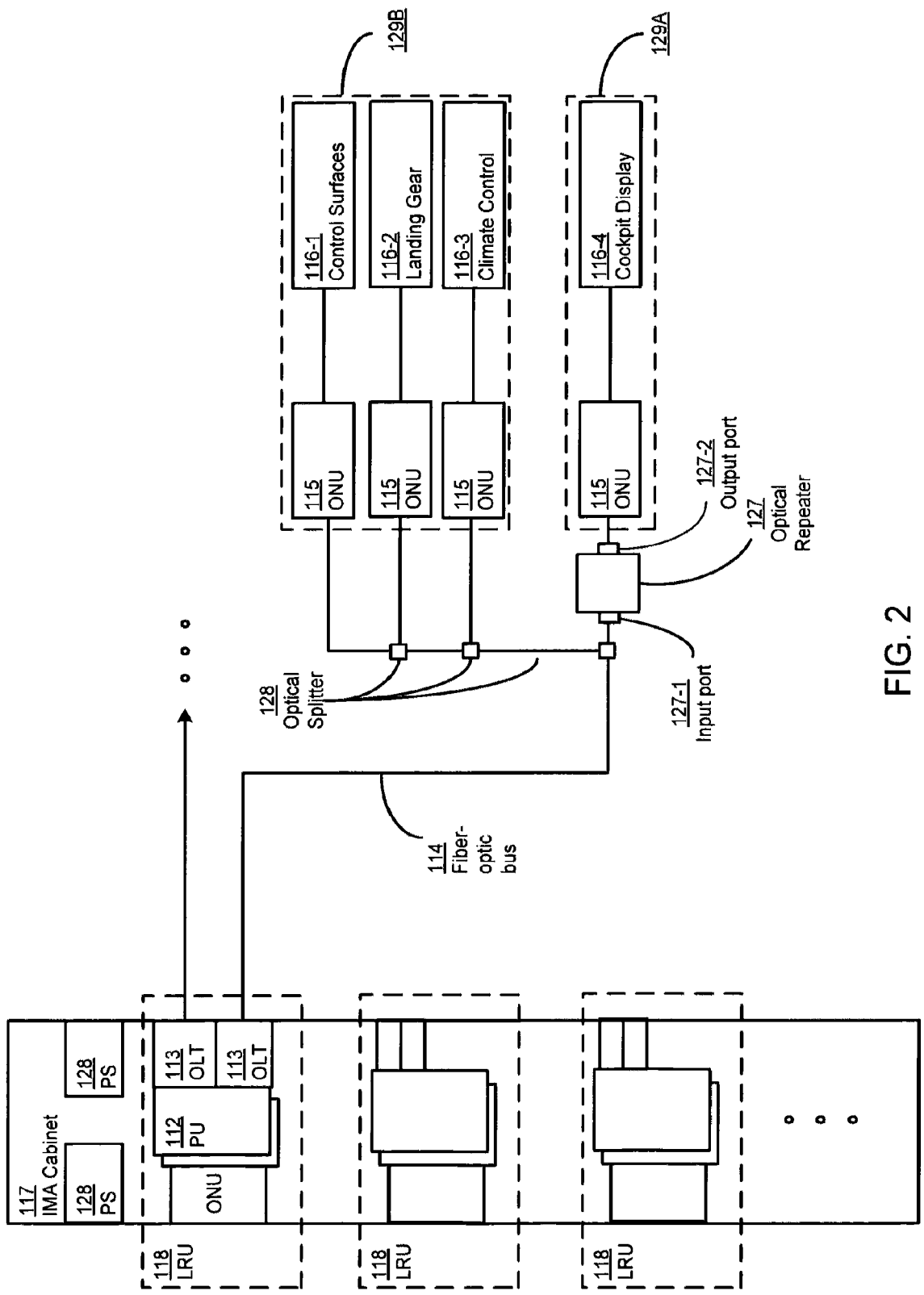
FIG. 2 illustrates a passive optical avionics network.

Referring to FIG. 2, a multi-tree PON-based avionics system 110 is illustrated. The PON-based avionics system 110 may be implemented as an integrated modular avionics (IMA) system comprising an IMA cabinet 117 containing multiple line-replaceable unit (LRU) processing modules 118. An LRU 118 may be removable system component designed to be replaced quickly at an airport ramp area. Such LRU 118 may be designed to common specifications so as to be interchangeable within multiple sockets within an avionics system as well as cross-compatible between multiple aircraft. An LRU 118 may comprise a processor 112 and at least one OLT 113.

One or more branches of a PON (e.g. PON branch 129A) may be logically and/or electrically isolated from the remaining PON tree (e.g. PON branches 129B) by an optical repeater 127 so as to restrict any fault-effect to the isolated PON branch 129A thereby avoiding impact on the remaining PON branches 129B of the PON tree.

The optical repeater 127 may have an input port 127-1 and at least one output port 127-2. A single strand of fiber may go out from a given OLT 113 over a fiber optic bus 114 to the input port 127-1 of the optical repeater 127.

The optical repeater 127 may be implemented as a monitor optical repeater 127. A monitor optical repeater 127 may have a passive optical connection linking the OLT 113 to the ONU 115 of PON branch 129A. The active monitor optical repeater 127 may include active monitoring circuitry and/or processing capabilities to analyze that the optical signal transmitted by the ONU 115 of PON branch 129A to the OLT 113 to determine compliance with a known signal protocol. Should the ONU 115 of PON branch 129A become unstable and/or fail, the monitor optical repeater 127 may regulate the transmission of an optical signal from that ONU 115. The monitor optical repeater 127 may detect that the signal being transmitted by the ONU 115 does not comply with the proscribed communication protocol (e.g. Ethernet protocols) and take appropriate action. For example, the monitor optical repeater 127 may halt optical communications between the ONU 115 of PON branch 129A to the OLT 113 by disrupting the passive optical path. This disruption may be in the form of a mechanism that physically or optically disrupts the path between the PON branch 129A and the remainder of the PON or can be through indirect means (e.g. disabling power to the ONU 115 of PON branch 129A). The monitor optical repeater 127 may be implemented to allow transient communication conditions that, when observed, halt transmissions only after a time interval as simplifications in use of an monitor optical repeater 127 may result if the system design can tolerate a momentary disruption in communication that is small with respect to critical time constants in the system.

Alternately, the optical repeater 127 may be implemented as an active repeater. In downstream communications from the OLT 113 to the ONU 115 on PON branch 129A, an active optical repeater 127 may receive optical signaling from the OLT 113, convert the optical signal to an electrical signal, process the electrical signal (e.g. amplify the signal, modify the signal, and the like), and retransmit the optical signal to the ONU 115. Similarly, in upstream communication from the ONU 115 to the OLT 113, the active optical repeater 127 may receive optical signaling from the ONU 115, convert the optical signal to an electrical signal, process the electrical signal (e.g. confirm the propriety of the signal), and retransmit the optical signal to the OLT 113.

Particularly, the active repeater may analyze the signal for compliance with a known protocol. For example, Ethernet protocols may govern communications between the ONU 115 and the OLT 113. Should the ONU 115 of PON branch 129A become unstable and/or fail, the active optical repeater 127 may regulate the transmission of an optical signal from that ONU 115. The active optical repeater 127 may detect that the signal being transmitted by the ONU 115 does not comply with the proscribed communication protocol (e.g. Ethernet protocols) and take appropriate action (e.g. delaying or terminating retransmission of the electrical signal as an optical signal from the ONU 115, requesting retransmission of optical data signal from the ONU 115, and the like).

Passive optical splitters 128 may also be incorporated to provide further branching for the optical signal to multiple ONU 115.

The IMA cabinet 117 may further include at least one power supply 128 (PS). One or more power supply modules may provide conditioned power to the various modules within an IMA cabinet. As depicted in FIG. 2, multiple power supplies 128 may provide redundancy in power sourcing.

The processor 112 may cause an OLT 113 to transmit data packets over the fiber optic bus 114 which may be received by each of the ONU 115. Transmit and receive signals within the PON-based avionics system 110 may operate on different wavelengths allowing bi-directional operation over a single fiber. In the depicted configuration, data packets transmitted from an OLT 113 may be transmitted as a burst over all fiber optic bus 114 lines to multiple ONU 115. The data packets may comprise an address header indicating a particular ONU 115 to which the data packet is to be directed. An ONU 115 may receive all data transmitted by the OLT 113 but may only process that data which is particularly addressed to that ONU 115 while discarding all other data.

Alternately, the data packet may be sent generically (e.g. without ONU 115 specific headers) to all ONU 115 where each ONU 115 may independently analyze the data packet for compatibility with the data requirements of an associated avionics module 116.

Upstream communication from an ONU 115 to an OLT 113 may be governed by a time division multiple access (TDMA) protocol. The ONU 115 may transmit in rapid succession, one after the other, each using a predetermined timeslot. This allows multiple ONU 115 to share the same fiber optic bus 114 while using only the part of the bandwidth that they require. On powering up, the OLT 113 may institute a discovery procedure in which it determines which ONU 115 are on a given bus and the round trip time to each ONU 115. Subsequent to the discovery procedure, when an ONU 115 has data to transmit to an OLT 113 it may send a report in which it requests a slot (time) in which to transmit the data. In return the OLT 113 sends a gate to the ONU 115 which defines the time slot in which ONU 115 may transmit the data. Information from an OLT 113 to the one or more ONU 115 is sent via a global broadcast. One or more ONU 115 may transmit in rapid succession but are not limited to a given sequence. The transmissions may be in a random sequence depending on the needs of each ONU 115 to communicate data to the OLT 113.

Further, a given LRU 118 may include multiple OLT 113 (e.g. two) to provide additional connectivity and/or redundancy within the PON-based avionics system 110.

Figure 3:
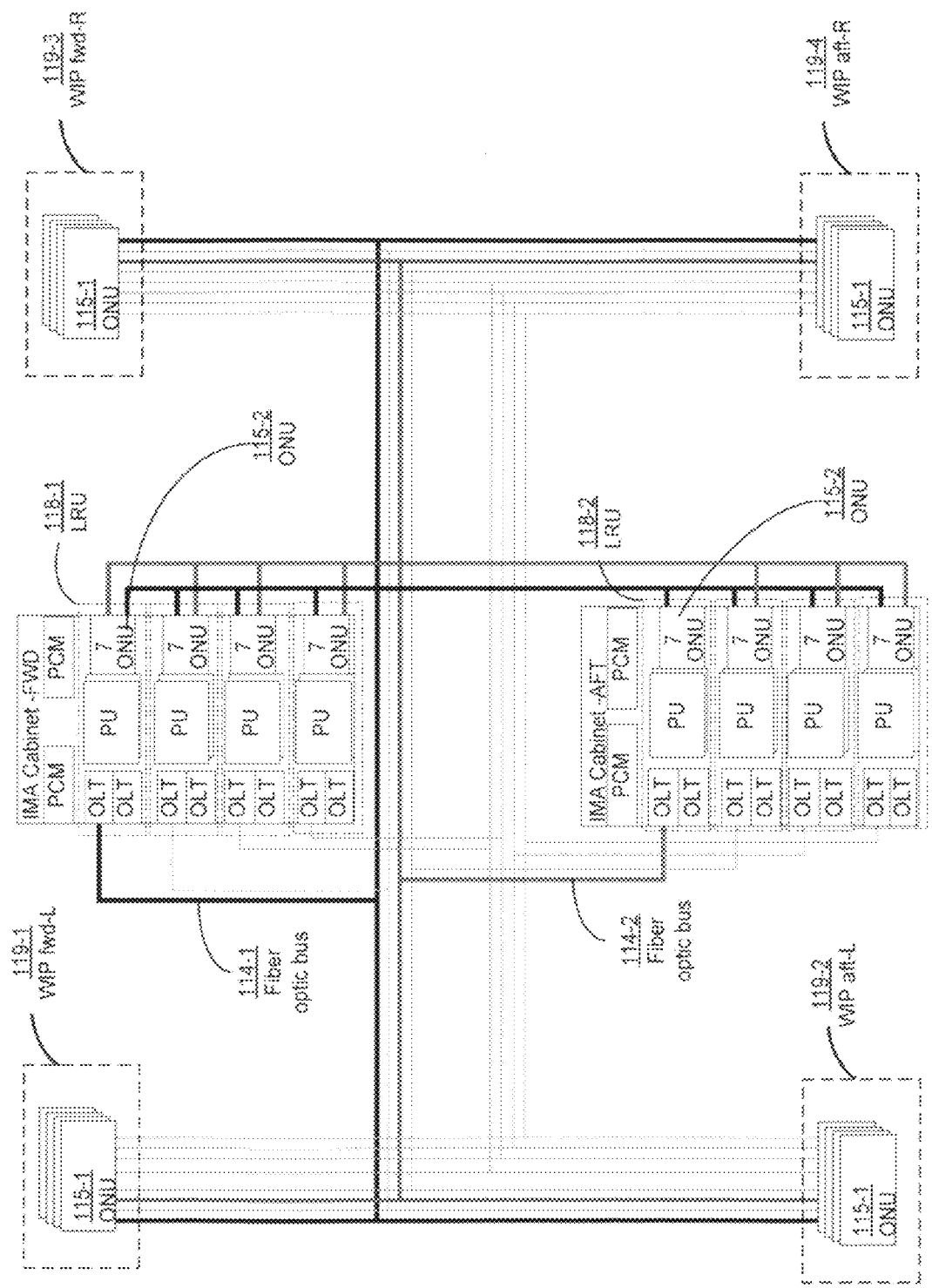
FIG. 3 illustrates an integrated modular avionics system.

Referring to FIG. 3, an eight-processing-LRU 118 configuration is illustrated where a first group of four LRU 118 are located in a first IMA cabinet 117-1 which may be located in a forward portion of an aircraft 100 and a second group of four LRU 118 are located in a second IMA cabinet 117-2 which may be located in an aft portion of an aircraft 100. It will be recognized that any number of IMA cabinets 117 each containing any number of LRU 118 may be incorporated into the PON-based avionics system 110. Such multiple-cabinet configurations may provide redundancies necessitated by various certification requirements and flexibility for the addition or modification of system functionality.

The OLT 113 of each LRU 118 may be ported to multiple ONU 115-1 disposed at various remote locations about the aircraft 100. For example an OLT 113 of LRU 118-1 may be ported to a cabling junction box (CJB) 119 containing multiple ONU 115-1 located in a forward-left, forward-right, aft-left and/or aft-right position via a first fiber optic bus 114-1. Similarly, an OLT 113 of LRU 118-2 may also be ported to the CJB 119 located in the forward-left, forward-right, aft-left and/or aft-right positions via a second fiber optic bus 114-1.

Further, each LRU 118 may comprise at least one integrated ONU 115-2 which may be linked to an OLT 113 of another LRU 118, thereby providing interconnectivity between the processing unit 111 of a given LRU 118 and the processing unit 111 of other LRU 118. For example, the OLT 113 of LRU 118-1 may each be ported to an ONU 115-2 of the remaining seven LRU 118 via the first fiber optic bus 114-1. Similarly, the OLT 113 of LRU 118-2 may be ported to an ONU 115-2 of the remaining seven LRU 118 via the second fiber optic bus 114-2. Each LRU 118 may have seven ONU 115 to provide connectivity with an OLT 113 the other seven LRU 118.

Figure 4:
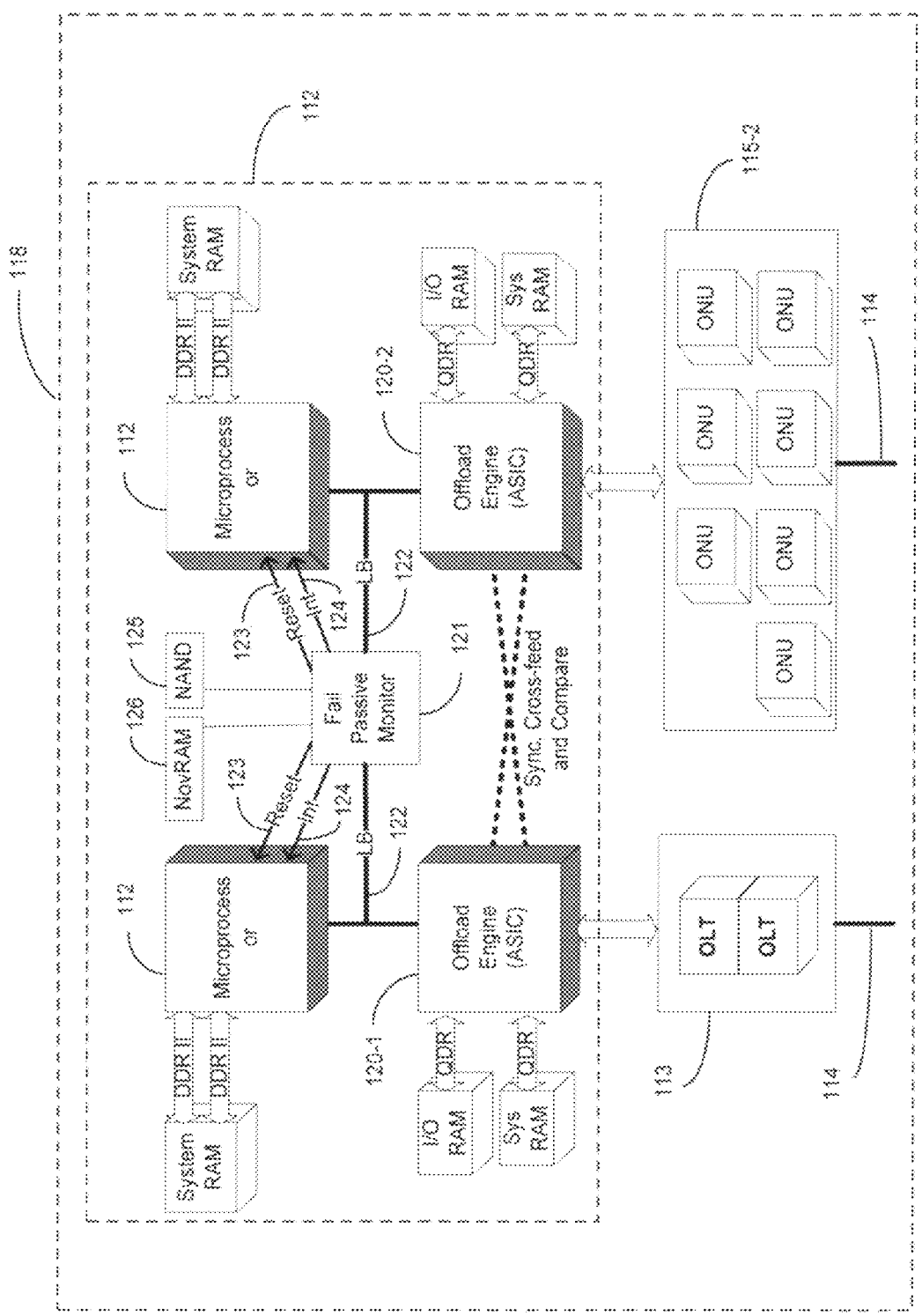
FIG. 4 illustrates an line replaceable unit.

Referring to FIG. 4 a low-level illustration of an example fail-passive LRU 118 is presented. A processing unit 111 may include a offload engine 120-1 operably coupled to an OLT 113 (e.g. a dual OLT such as the TK3723 model manufactured by Teknovus Inc.) The offload engine 120-1 may be an application specific integrated circuit (ASIC) tasked with routing outgoing data from a processor 112 (e.g. a processor such as MPC8641 model manufactured by Freescale Semiconductor) the to the OLT 113 for transmission across a fiber optic bus 114 to remote ONU 115-1 (e.g. an ONU such as the TK3714 model manufactured by Teknovus Inc.) distributed about the aircraft 100 or integrated ONU 115-2 disposed within other LRU 118 in order to provide a path for return data from the remote ONU 115-1 to the processor 112. Similarly, a second offload engine 120-2 may be tasked with routing incoming data (e.g. data originating from an OLT 113 of a sibling LRU 118) between an ONU 115-2 and a processor 112. In this fail-passive processing example, the offload engine 120-1 and offload engine 120-2 may each include two internal components. One component may provide interface capability with the OLT 113 and ONU 115-2 devices respectively. The other component may synchronize, cross-feed, and cross-compare the data such that both processor 112 are provided with correct and consistent data. For other applications where fail-passive processing is not needed, a single processor 112 and offload engine 120 may be employed, where the offload engine 120 provides interfaces for both the OLT 113 and ONU 115 devices.

For the fail-passive example shown, a fail-passive monitor 121 may provide a cross-comparison function between local buses 122 (LB) associated with each processor 112. The fail-passive monitor 121 may detect differences in data provided to each processor 112 which may indicate a failure, thereby ensuring the integrity of data. This fail-passive monitor 121 may further provide functions which aid in the synchronization of the processors, allowing them to produce identical results on identical data for a fault-free case. A synchronized reset 123 and synchronized interrupt 124 may be provided to both processors to maintain synchronization for switching among multiple processes. As an implementation convenience, the fail-passive monitor 121 may provide interfaces with memory devices that are not required to be dual for fail-passivity (e.g. a NAND program memory 125; non-volatile data memory 126). For such cases, other means such as CRCs may be used to ensure the necessary data integrity rather than use of a dual configuration.

It is believed that the present invention and many of its attendant advantages will be understood by the foregoing description. It is also believed that it will be apparent that various changes may be made in the form, construction and arrangement of the components thereof without departing from the scope and spirit of the invention or without sacrificing all of its material advantages. The form herein before described being merely an explanatory embodiment thereof. It is the intention of the following claims to encompass and include such changes.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure.

In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a Compact Disc (CD), a Digital Video Disk (DVD), a digital tape, a computer memory, etc.; and a transmission type medium such as a digital and/or an analog communication medium (e.g., a fiber optic cable, a waveguide, a wired communications link, a wireless communication link (e.g., transmitter, receiver, transmission logic, reception logic, etc.), etc.).

Those having skill in the art will recognize that the state of the art has progressed to the point where there is little distinction left between hardware, software, and/or firmware implementations of aspects of systems; the use of hardware, software, and/or firmware is generally (but not always, in that in certain contexts the choice between hardware and software can become significant) a design choice representing cost vs. efficiency tradeoffs. Those having skill in the art will appreciate that there are various vehicles by which processes and/or systems and/or other technologies described herein can be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; alternatively, if flexibility is paramount, the implementer may opt for a mainly software implementation; or, yet again alternatively, the implementer may opt for some combination of hardware, software, and/or firmware. Hence, there are several possible vehicles by which the processes and/or devices and/or other technologies described herein may be effected, none of which is inherently superior to the other in that any vehicle to be utilized is a choice dependent upon the context in which the vehicle will be deployed and the specific concerns (e.g., speed, flexibility, or predictability) of the implementer, any of which may vary. Those skilled in the art will recognize that optical aspects of implementations will typically employ optically-oriented hardware, software, and or firmware.

What is claimed is:

1. An integrated modular avionics (IMA) system comprising:
    a line-replaceable unit (LRU), the LRU comprising:
        a processing unit; and
        an optical line terminal (OLT);
    a passive optical network operably coupled to the OLT;
    an optical repeater operably coupled to the passive optical network;
    at least one optical network unit (ONU) operably coupled to the optical repeater; and
    an avionics module operably coupled to the at least one ONU.

2. The system of claim 1, wherein the optical repeater comprises:
    an active optical repeater.

3. The system of claim 1, wherein the optical repeater comprises:
    a monitor optical repeater.

4. The system of claim 1, further comprising:
    a passive optical splitter.

5. The system of claim 1, wherein the processing unit further comprises:
    a first offload engine; and
    a first processor.

6. The system of claim 5, wherein the processing unit further comprises:
    a second offload engine; and
    a second processor.

7. The system of claim 1, wherein the LRU further comprises:
    at least one ONU.

8. The system of claim 1, further comprising:
    a second LRU, the second LRU comprising:
        a processing unit; and
        at least one ONU,
    wherein the at least one ONU of the second LRU is operably coupled to the OLT of the first LRU.

9. The system of claim 1, wherein the system implements an Ethernet protocol.

10. The system of claim 9, wherein the system implements Ethernet Passive Optical Network (EPON) protocol.

11. The system of claim 9, wherein the system implements Gigabit Ethernet Passive Optical Network (GEPON) protocol.

* * * * *